US011253998B2

(12) United States Patent
Szabo et al.

(10) Patent No.: US 11,253,998 B2
(45) Date of Patent: Feb. 22, 2022

(54) METHOD AND ARRANGEMENT FOR DETERMINATION OF A TRAJECTORY FOR A ROBOT DEVICE IN A CLOUD

(71) Applicant: Telefonaktiebolaget LM Ericsson (publ), Stockholm (SE)

(72) Inventors: Geza Szabo, Kecskemet (HU); Attila Báder, Paty (HU); Sándor Rácz, Cegléd (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 179 days.

(21) Appl. No.: 16/641,313

(22) PCT Filed: Oct. 4, 2017

(86) PCT No.: PCT/EP2017/075207
§ 371 (c)(1),
(2) Date: Feb. 24, 2020

(87) PCT Pub. No.: WO2019/068319
PCT Pub. Date: Apr. 11, 2019

(65) Prior Publication Data
US 2020/0384638 A1 Dec. 10, 2020

(51) Int. Cl.
*G06F 15/16* (2006.01)
*B25J 9/16* (2006.01)
(Continued)

(52) U.S. Cl.
CPC ............. *B25J 9/161* (2013.01); *B25J 13/006* (2013.01); *G05B 19/4155* (2013.01);
(Continued)

(58) Field of Classification Search
CPC ..... B25J 9/161; B25J 13/006; G05B 19/4155; G05B 2219/40174; G05B 2219/40269; H04L 67/2823
(Continued)

(56) References Cited

U.S. PATENT DOCUMENTS 8,532,820 B1 * 9/2013 Sampath ................. G06Q 10/06
700/248
8,639,644 B1 * 1/2014 Hickman ................ G06N 3/008
706/14
(Continued)

OTHER PUBLICATIONS

Remy, S. et al., "Distributed Service-Oriented Robotics", IEEE Internet Computing: Web-Scale Workflow, vol. 15, Mar. 1, 2011, pp. 70-74, IEEE.
(Continued)

*Primary Examiner* — Alicia Baturay
(74) *Attorney, Agent, or Firm* — Coats & Bennett, PLLC (57) ABSTRACT

The present disclosure relates to a Web server (104, 60, 70) and a method therein of determining a trajectory for controlling of a robot device over a cloud interface. From a URI-encoded HTTP request (402) for the trajectory between a first pose and a second pose of the robot device, it is determined (S112, 408) the length of matching between cached trajectories and the trajectory requested. The longest length of matching is compared (S114, 410) to a minimal matching length (406), and if the longest length is longer than the minimal matching length, a HTTP response is sent (S122, 412) comprising the trajectory being determined. If the longest length is shorter than the minimal matching length, a HTTP request to calculate is sent (S116, 414). Currently available web service architecture can be reused, and easily up-scaled.

13 Claims, 5 Drawing Sheets

(51) Int. Cl.
    *B25J 13/00*         (2006.01)
    *G05B 19/4155*     (2006.01)
    *H04L 67/565*      (2022.01)

(52) U.S. Cl.
    CPC ............ *H04L 67/2823* (2013.01); *G05B 2219/40174* (2013.01); *G05B 2219/40269* (2013.01)

(58) Field of Classification Search
    USPC .......................................................... 709/230
    See application file for complete search history.

(56) References Cited

U.S. PATENT DOCUMENTS

| | | | | |
|---|---|---|---|---|
| 8,798,791 | B2 | 8/2014 | Li et al. | |
| 9,031,692 | B2* | 5/2015 | Zhu | H04L 67/12 |
| | | | | 700/248 |
| 9,802,309 | B2* | 10/2017 | Kuffner | B25J 9/0084 |
| 10,032,137 | B2* | 7/2018 | Skiba | H04L 67/42 |
| 10,469,588 | B2* | 11/2019 | Gorshechnikov | H04L 67/10 |
| 10,555,054 | B2* | 2/2020 | Byers | H04Q 1/025 |
| 10,603,794 | B2* | 3/2020 | Buibas | H04N 5/2252 |
| 10,646,998 | B2* | 5/2020 | Amir | B25J 11/008 |
| 10,723,027 | B2* | 7/2020 | Amacker | B25J 9/1689 |
| 10,880,470 | B2* | 12/2020 | Buibas | H04N 5/23222 |
| 2009/0157224 | A1* | 6/2009 | Blanc | G05B 19/416 |
| | | | | 700/250 |
| 2010/0145514 | A1* | 6/2010 | Kim | B25J 9/1661 |
| | | | | 700/248 |
| 2010/0241693 | A1* | 9/2010 | Ando | G06Q 30/06 |
| | | | | 709/203 |
| 2013/0166621 | A1* | 6/2013 | Zhu | H04L 67/12 |
| | | | | 709/201 |
| 2016/0023351 | A1* | 1/2016 | Kuffner | B25J 9/0084 |
| | | | | 700/248 |
| 2020/0233436 | A1* | 7/2020 | Fox | H04L 67/1002 |
| 2021/0026329 | A1* | 1/2021 | Szabo | B25J 9/1689 |

OTHER PUBLICATIONS

Kehoe, B. et al., "A Survey of Research on Cloud Robotics and Automation", IEEE Transactions on Automation Science and Engineering, vol. 12 No. 2, Apr. 1, 2015, pp. 398-409, IEEE.

Ellekilde, L. et al., "Motion Planning Efficient Trajectories for Industrial Bin-Picking", The International Journal of Robotics Research, vol. 32 No. 9-10, Jun. 20, 2013, pp. 991-1004, IJRR.

* cited by examiner

METHOD AND ARRANGEMENT FOR DETERMINATION OF A TRAJECTORY FOR A ROBOT DEVICE IN A CLOUD

TECHNICAL FIELD

This disclosure relates to controlling of robot devices. In more particular, it relates to a method and a Web server for determining a trajectory for controlling a robot device in a cloud.

BACKGROUND

Moving robotics and automation algorithms into the cloud requires frameworks that facilitate this transition. The cloud provides three possible levels at which a framework could be implemented. The lowest level is Infrastructure as a Service (IaaS), where bare operating systems are provided on machines, which can be virtualized, in the cloud. The second level, Platform as a Service (PaaS), provides more structure, including application frameworks and database access, while restricting the choice of programming languages, system architectures, and database models, which can be used. Software as a Service (SaaS), the third level is the highest level of structure of which there is a demand these days.

The current focus of cloud based robotics is to either speed up the processing of input data collected from many sensors with big data computation, or to collect various knowledge bases in centralized locations e.g., possible grasping poses of various three-dimensional (3D) objects.

Today cloud robotics exists mostly following the PaaS approach. However, with the help of $5^{th}$ generation wireless systems (5G), the PaaS approach may be extended to use the SaaS paradigm offering many potential advantages for robots and automation systems.

From U.S. Pat. No. 9,031,692 B2 it is known a cloud robot system and a method for integrating the same. In this document the cloud can be used to scale up complex calculation tasks, of which one refers to a robot relates task.

Patent document U.S. Pat. No. 8,798,791 B2 teaches a robot control system and a robot control method. This document relates to moving a robot control in the cloud to a point that is closest to the robot that the user wishes to control.

With SaaS, an interface allows data to be sent to a server that processes the data as input and returns output, which relieves users of the burden of maintaining data, software and hardware, and also allows companies to control proprietary software. This approach is called this Robotics and Automation as a Service (RAaaS).

There is however a demand for a more versatile robot service and control.

SUMMARY

It is an object of embodiments of the disclosure to address at least some of the issues outlined above, and this object and others are achieved by a Web server, a method performed therein, a computer program and a computer-readable storage medium for determining a trajectory for controlling a robot device over a web interface in a cloud.

According to an aspect, the disclosure provides a method of determining a trajectory in a Web server for controlling a robot device over a web interface in a cloud. The method comprises receiving a hypertext transfer protocol (HTTP) request for the trajectory between a first pose and a second pose of the robot device, wherein the HTTP request comprises a unified resource identifier (URI) string comprising information about said first and second poses.

The method also comprises obtaining, based on said information about said first and second poses, a URI-encoding of said first and second poses in the URI string, said URI string comprising a set of values defining each first and second pose. Obtaining also comprises obtaining digits from each set of values, and with the same weight grouped together, where the digits of each one of said groups are positioned one after the other in said URI string, and wherein the groups are ordered according to decreasing weight of digits in each group.

The method also comprises obtaining a minimally required length of matching digits between a URI-encoded trajectory being requested and a URI-encoded trajectory to be determined.

Also, the method comprises determining the longest length of matching digits between a URI-encoding of any one of trajectories in a storage and the URI-encoded trajectory being requested.

The method further comprises determining whether said longest length of matching digits is shorter than the minimally required length of matching digits, or not.

In addition, the method comprises sending a HTTP response, as a response to the HTTP request, said HTTP response comprising the trajectory being determined, when the longest length of matching digits is, equal to or, longer than the minimally required length of matching digits. Also, the method comprises sending a HTTP request to a trajectory generator service (TGS) to calculate the trajectory being requested, when the longest length of matching digits is shorter than the minimally required length of matching digits.

According to another aspect, the disclosure provides Web server capable of determining a trajectory for controlling a robot device over a Web interface in a cloud. The Web server comprises a processor circuit and a memory that has instructions which are executable by the processor circuit. When executing these instructions, the processing circuit is configured to receive a HTTP request for the trajectory between a first pose and a second pose of the robot device, where the HTTP request comprises a unified resource identifier, URI, string, comprising information about said first and second poses. When executing these instructions, the processing circuit is configured to obtain, based on said information about said first and second poses, a URI-encoding of said first and second poses in the URI string, said URI string comprising a set of values defining each first and second pose. When executing these instructions, the processing circuit is configured to obtain digits from each set of values and with the same weight grouped together, where the digits of each one of said groups are positioned one after the other in said URI string, and wherein the groups are ordered according to decreasing weight of digits in each group. When executing these instructions, the processing circuit is configured to obtain a minimally required length of matching digits between a URI-encoded trajectory being requested and a URI-encoded trajectory to be determined. When executing these instructions, the processing circuit is also configured to determine the longest length of matching digits between the URI-encoded trajectory being requested and a URI-encoding of any one of trajectories in a storage. When executing these instructions, the processing circuit is also configured to determine whether said longest length of matching digits is shorter than the minimally required length of matching digits, or not. In addition, when executing these instructions, the processing circuit is configured to send a HTTP response, as a response to the HTTP request, said HTTP response comprising the trajectory to be determined, when the longest length of matching digits is, equal to or, longer than the minimally required length of matching digits. The processing circuit is also configured to send a HTTP request to a TGS to calculate the trajectory being requested, when the longest length of matching digits is shorter than the minimally required length of matching digits.

According to yet another aspect, the disclosure provides a computer program for robot device control comprising instructions which, when executed on at least one processor, cause the at least one processors to carry out the method according to aspects as described above.

According to yet another aspect, the disclosure provides a computer-readable storage medium, having thereon said computer program.

Embodiments of the present disclosure comprise the following advantages:

An advantage of embodiments of the present disclosure is that current web service architecture can be reused.

Another advantage of embodiments of the present disclosure is that the teaching is easily scalable, since it uses the hypertext transfer protocol.

In addition, a further advantage of embodiments of the present disclosure is that determining matching between a trajectory being determined and a requested trajectory requires only small computational resources, thereby avoiding potential latency problems.

BRIEF DESCRIPTION OF THE DRAWINGS

Embodiments will now be described in more detail, and with reference to the accompanying drawings, in which.

DETAILED DESCRIPTION

In the following description, different embodiments of the disclosure will be described in more detail, with reference to accompanying drawings. For the purpose of explanation and not limitation, specific details are set forth, such as particular examples and techniques in order to provide a thorough understanding.

Although robotic service has been exposed as a Web service by others, the focus has been on monitoring tasks. Little of the benefits of existing Web services are thus exploited.

It has been noted that existing trajectory or path generation methods in cloud robot control generally do not use Web services. Also, these existing methods do not utilize Web-storing mechanisms, such as caching.

There is thus a demand for a more versatile robot service and control.

Proposed embodiments of the present disclosure solution are based on and utilize a currently existing Web service infrastructure to provide robot control in the cloud. It is herein disclosed how to efficiently handle requests for a trajectory, or trajectory object. Operation of disclosed method allows efficient use of caching mechanism of content delivery network (CDN). This determination is in general performed within a Web server, and in more particular is hence performed by a trajectory aware cache (TAC) in a CDN.

The Web server, of more specifically the TAC, may be operable to handle requests for a trajectory, where requests may comprise start and goal poses of a requested trajectory for a robot device, which start and goal poses may be encoded in unified resource identifier (URI) within the request. The web server, or the TAC, determines a trajectory that meets the requested trajectory, by accessing a trajectory storage. The trajectory hereby being determined is thus obtained from the storage, and has therefore already been stored, or cached, therein.

In order to determine a trajectory to meet a requested trajectory, a measure of how much the start and goal poses of the requested trajectory differ from the determined trajectory is determined. This measure is determined in a coordinate system of the robot device. Also this measure is determined from URI-encoded start and goal poses for the requested trajectory and the trajectory being determined. In order to identify a trajectory to meet the requested trajectory a maximum tolerance measure may be used, which maximum tolerance measure may be considered to reflect a degree of matching between the requested trajectory and the trajectory being determined. It may then be determined to what extent the trajectory being determined matches the requested trajectory. If the trajectory being determined, and thus obtained from the storage, matches the request trajectory sufficiently well, the Web server, of the TAC, sends a response to the trajectory request, where said response comprises the determined trajectory.

If the trajectory being determined does not sufficiently well matches the requested trajectory, the web server or the TAC sends a request to a trajectory generator service (TGS) to calculate a trajectory that fits the requested trajectory. Having received a request to calculate a trajectory, the TGS may thus send in return a trajectory that fits the requested trajectory. The TGS may optionally calculate additional trajectories, depending on the current load. Down below, various features and actions will be explained in more detail.

Figure 1:
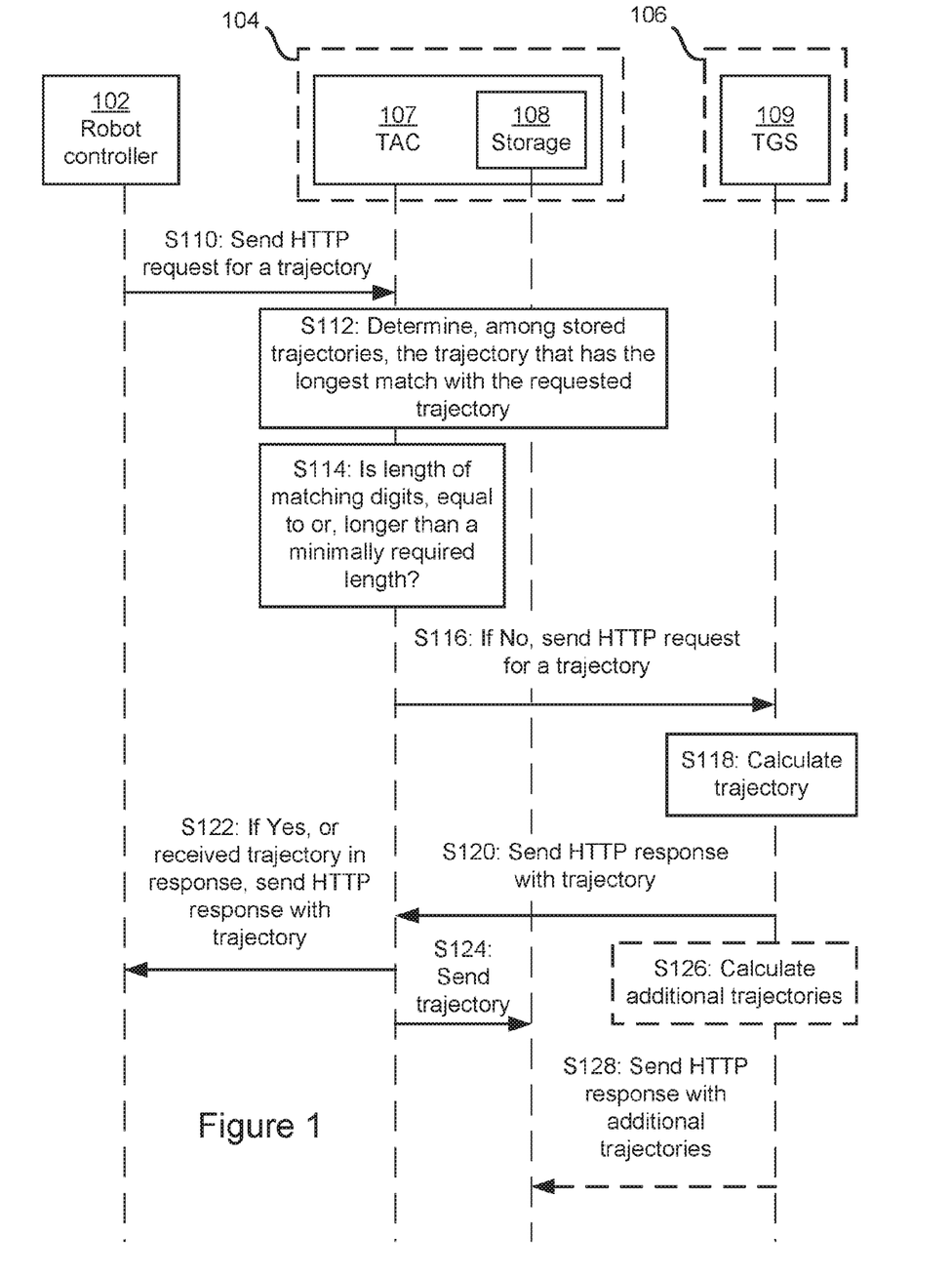
FIG. 1 illustrates an overall handshake diagram, related to according to embodiments of the present disclosure.

FIG. 1 illustrates an overall handshake diagram, related to according to embodiments of the present disclosure. The handshake diagram comprises handshake between a robot controller 102, a web server 104 and another web server 106.

The web server 104 may comprise a trajectory aware cache (TAC) 107 having a storage 108. Said another web server 106 comprises a trajectory generator service (TGS).

Action S110: The robot controller 102 sends a request for a trajectory, said request being a hypertext transfer protocol (HTTP) request. This request is sent to the web server 104, and in particular to the TAC 107. This HTTP request for the trajectory comprises start and goal poses of the robot device. These poses may be URI-encoded in a URI string in the request. Alternatively, information about these poses may be comprised in the request, such that a web server 104 receiving the request can read parameters being addressed in the URI addressed, and obtain start and goal poses of the robot device.

Action S112: The web server 104, or the TAC 107 accessing the storage 108, determines among stored trajectories, a stored trajectory that has the longest match with the requested trajectory. A length of a match comprises the length of matching digits between the two trajectories.

Action S114: It is here determined whether the length of matching digits is, equal to or, longer than a minimally required length of matching digits.

Action S116: When it is determined that the length of matching digits between the trajectory being determined and the requested trajectory, is shorter than a minimally required length, the TAC 107 sends a HTTP request to said another web server 106, in particular the TGS 109.

This HTTP request, as sent in action S116, for a trajectory is thus a request for a trajectory to be generated by the TGS 109. This HTTP request comprises information about the start and goal poses of the requested trajectory, for the calculation of a trajectory that meets requirements of the requested trajectory.

Action S118: The TGS 109 having received the HTTP request for a trajectory to be generated, generates a trajectory by calculating a trajectory based on information about the start and goal poses of the requested trajectory.

Action S120: The TGS sends a HTTP response comprising the generated trajectory, to the web server 104, or TAC 107.

Action S122: If the trajectory being determined in action S112, is found to sufficiently well match the requested trajectory, more precisely, that the length of matching digits between the trajectory being determined and the requested trajectory, is equal to or longer than a minimally required length of matching digits, in action S114, the web server 104, or the TAC 107, sends a HTTP response to the robot controller 102, where said response comprises the trajectory being determined. Action S122 may alternatively be performed as a consequence of a HTTP response, as received from the TGS 109, or said another web server 106, in action S120, where said response comprises the trajectory as generated in action S118.

In action S122, the robot device 102 hence receives a HTTP response comprising a trajectory that meets requirements of the requested trajectory.

Action S124: The web server 104, or the TAC 107, forwards the determined or generated trajectory to the storage 108, such that said trajectory is cached in the storage 108, providing an efficient caching mechanism within a content delivery network (CDN).

Action S126: Optionally, the TGS 109 may further calculate additional trajectories, dependent on the current load of said another web server 106, or TGS 109. These additional trajectories may be calculated to be concatenated with other, possibly already existing, trajectories to meet requirements of requests for trajectories. The TGS may alternatively, receive requests from one or more web servers other than web server 104, to generate said additional trajectories.

Action S128: Optionally, the TGS 109 may consequently send the additional trajectories as calculated in action S126, to the storage 108 for caching of said additional trajectories.

The present disclosure locates trajectory determination and optionally generation into the cloud. A robot device may hence be instrumented, by providing a trajectory that meets a requested trajectory, from the cloud. A web service provided, related to the embodiments of the present disclosure, may be performed stateless in a RESTful way. A received HTTP request for a trajectory is typically served by a TAC 107 located within web server 104. An optional request for generation of a trajectory may be served by the TGS 109 located in said another web server 106.

In case of an increased load, a service may be scaled up by the TGS 109, due to the stateless property of the service used.

Figure 2:
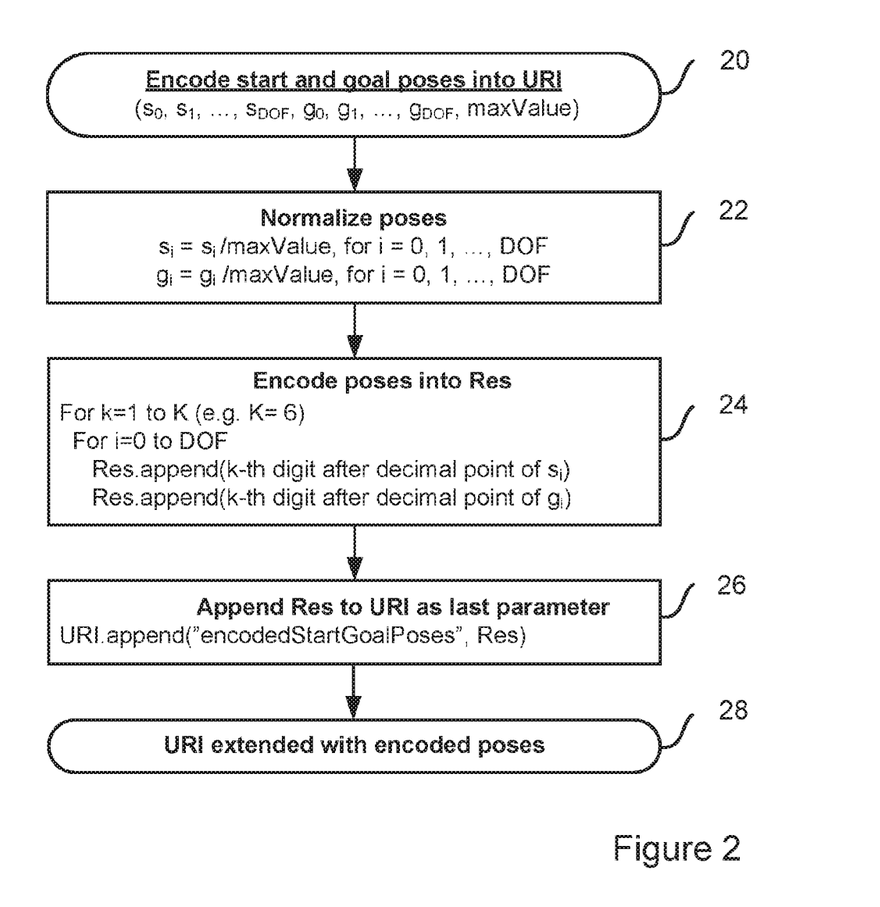
FIGS. 2 and 3 present an example how to encode start and goal poses, and a precision, respectively into a URI, related to embodiments of this disclosure.

FIG. 2 presents an example how to encode start and goal poses for a trajectory, into a URI, related to embodiments of this disclosure.

Status 20: The task of encoding the start pose into URI, is based on start components $s_0, s_1, \ldots s_{DOF}$, where $0, \ldots,$ DOF denote degrees of freedom of the robot device. These may denote three translation degrees, three rotation degrees, and time.

Similarly, the task of encoding the goal pose into URI, is based on goal components $g_0, g_1, \ldots g_{DOF}$, where $0, \ldots,$ DOF denote degrees of freedom of the robot device. These may thus denote time, three translation degrees, and three rotation degrees.

Action 22: Encoding may comprise normalizing the start and goal poses. This is performed by normalizing each component by dividing each component with the maxValue. Consequently, $s_i = s_i/\text{maxValue}$ is performed for $i=0, 1, \ldots,$ DOF. Also, components for the goal pose are normalized; $g_i = g_i/\text{maxValue}$, for $i=0, 1, \ldots,$ DOF.

Action 24: The start and goal poses are appended into a Res parameter. Letter "k" denotes the number of decimal digits of a normalized component, and "i" denotes the degree of freedom. For the $s_0$ component, append the first decimal (k=1) to Res. For the $g_0$ component, append the first decimal to Res. Then, append the first decimal of the $s_1$ component, after which the first decimal of the $g_1$ component, to Res. Thereafter the first decimals of $s_2, g_2, s_3, g_3, \ldots s_{DOF}, g_{DOF}$ are appended to Res.

Then the second decimal (k=2) of $s_0$ is appended to Res, followed by second decimal of $g_0, s_1, g_1, \ldots, s_{DOF}, g_{DOF}$.

Thereafter, the third (k=3) up to the sixth (k=6) decimals of $s_0, g_0, \ldots s_{DOF}, g_{DOF}$ are appended to Res.

The group of 2×DOF digits for each value of k, may be considered to form a group of digits having the same weight in respective component of first and second poses. As k increases from 1 to for instance 6, the weight of each digit as read form respective component thus decreases.

Components of each pose may be regarded as a set of values defining each first and second pose.

Action 26: The Res parameter is then appended to URI as last parameter by appending Res to "encodedStartGoalPoses" in the URI.

For example, when DOF=3, maxValue=10, start pose s={1.234, 5.678, 1.111}, and goal pose g={9.876, 5.432, 2.100}, the URI-parameter="encodedStartGoalPoses= 151952261841371730481620".

Explained in more detail,

The values defining the start pose s, are $s_0$, $s_1$, and $s_2$, and may be regarded as components of s. After normalizing $s_0$=0.1234, $s_1$=0.5678 and $s_2$=0.1111.

The digits herein have different weights, as the first decimal has ten times the weight of the second decimal. The weight of the second decimal has ten times the weight of the third decimal, and so on.

Since digits from same decimal position are grouped after one another according to action 24 of FIG. 2, such digits may be regarded to form a group of digits having the same weight. Digits from each one of other positions having a lower weight may be considered to each form a group and will hence be appended in the URI string, in an order of decreasing weight.

When determining a matching length between a trajectory being determined and a requested trajectory, a mismatch the first decimal, i.e. will thus provide a relatively small number of matching digits. For instance, a mismatch only in a fifth decimal provides a relatively high number of matching digits. The weight of digits in the group comprising these digits is thus relatively low, since the weight decreases and is only 1/10 of the weight of the preceding group.

The Res parameter is thus here equal to 15195226184137173048 1620.

Status 28: The URI has thus been extended by the appended encoded poses.

Figure 3:
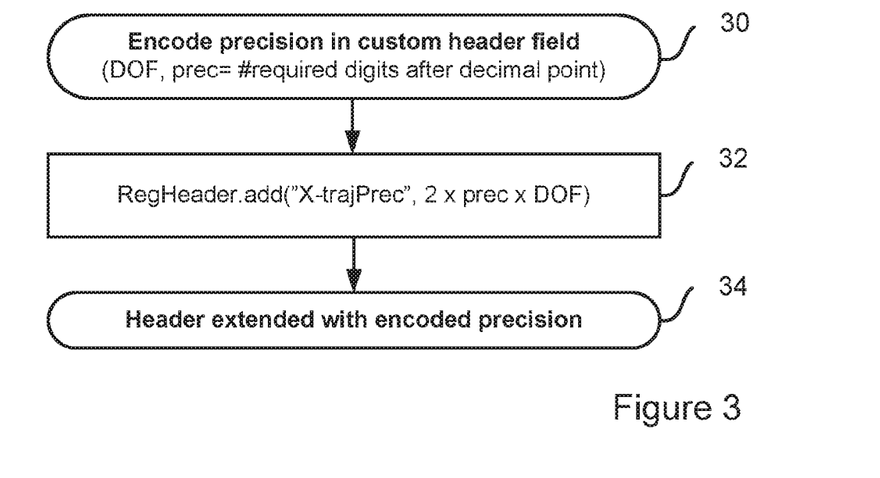

FIG. 3 presents an example how to encode precision in a custom header field of a URI, related to embodiments of this disclosure.

Status 30: The task of encoding a precision in a custom header field is herein based in the degrees of freedom, DOF of the poses, as well as a precision measure, Prec, being the number of required digits after the decimal point of the normalized components of the start and goal poses.

Action 32: It is now calculated 2×Prec×DOF, stored in a "X-trajPrec" parameter, which is added to the header of the request, ReqHeader.

Status 34: The header is thus extended by the encoded precision.

Down below, in relation with FIG. 5, it will be described how to use the X-trajPrec parameter.

Figure 4:
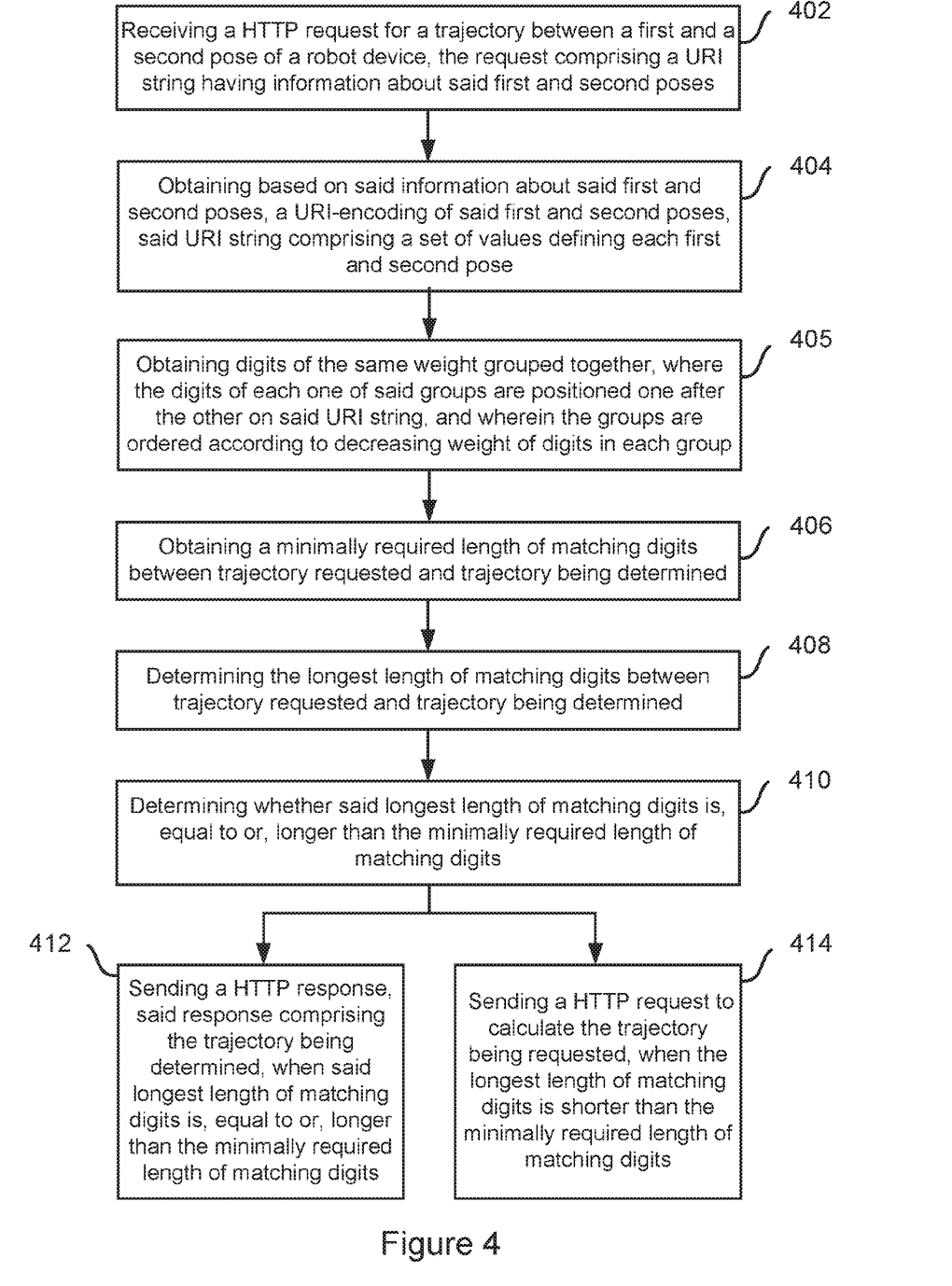
FIG. 4 presents a flow chart of actions of a method according to embodiments of this disclosure.

FIG. 4 presents a flow chart of actions of a method according to embodiments of this disclosure. The method is a method of determining a trajectory in a Web server 104, 60, 70 for controlling a robot device over a web interface in a cloud.

Action 402: The method comprises receiving a hypertext transfer protocol (HTTP) request for the trajectory between a first pose and a second pose of the robot device. The HTTP request comprises a unified resource identifier (URI) string comprising information about said first and second poses.

Action 404: The method also comprises obtaining a URI-encoding of said first and second poses in the URI string, based on said information about said first and second poses. The URI string comprises a set of values defining each first and second pose.

Obtaining said URI-encoding of said first and second poses may comprise reading said information about said first and second poses and URI-encoding said read first and second poses into the URI string.

Action 405: The method also comprises obtaining digits from each set of values and with the same weight grouped together, where the digits of each one of said groups are positioned one after the other in said URI string, and the groups are ordered according to decreasing weight of digits in each group.

Action 406: Obtaining a minimally required length of matching digits between a URI-encoded trajectory being requested and a URI-encoded trajectory to be determined.

Obtaining the minimally required length of matching digits may comprise obtaining said minimally required length encoded in a header field of the hypertext transfer protocol (HTTP).

Obtaining said minimally required length of matching digits may comprise determining said minimally required length based on a required precision measure.

Determining said minimally required length may be based on the length of URI-encoded said first and second poses of the trajectory being requested, a length based on the required precision measure, and the length of the URI string.

It is noted that "minimal matching length" and "minimally required length of matching digits", as used herein, denote one and the same number.

Action 408: Determining the longest length of matching digits between a URI-encoding of any one of trajectories in a storage and the URI-encoded trajectory being requested.

Action 410: Determining whether said longest length of matching digits is equal to or longer than the minimally required length of matching digits, or not.

Either Action 412 or action 414 is performed, dependent on the determination in action 410.

Action 412: The method comprises sending a HTTP response, said response comprising the trajectory being determined, when said longest length of matching digits is, equal to or, longer than the minimally required length of matching digits.

Action 414: The method comprises sending a HTTP request to calculate the trajectory being requested, when the longest length of matching digits is shorter than the minimally required length of matching digits.

The method may be performed in a HTTP cache of the Web server 104, 60, 70.

The present disclosure also comprises a computer program for robot control comprising instructions which, when executed on at least one processor, causes the at least one processor to carry out the method of the actions above.

The present disclosure also comprises a computer-readable storage medium, having thereon the computer program of above.

Figure 5:
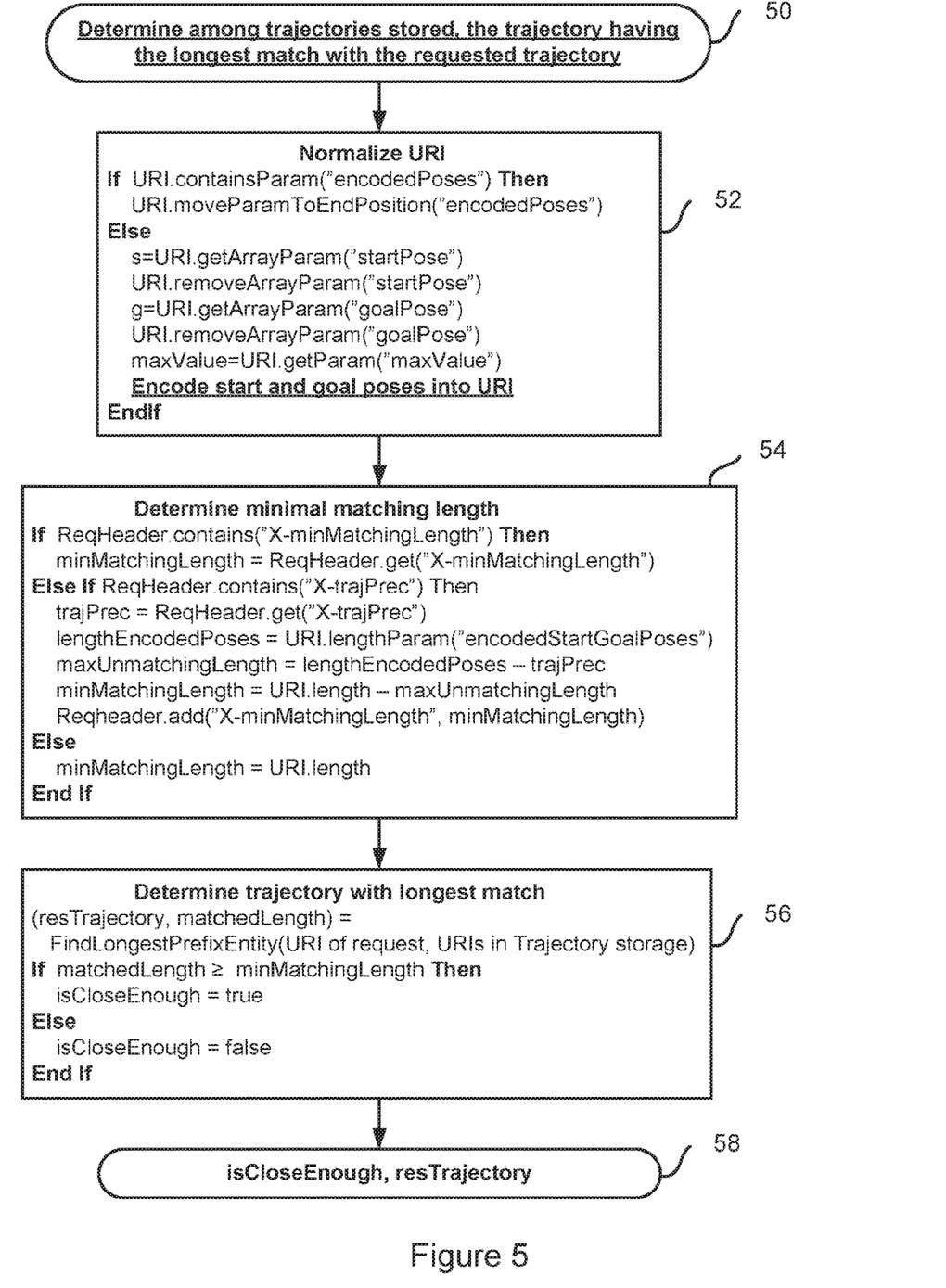
FIG. 5 presents how to determine a trajectory having the longest match with the requested trajectory, according to embodiments of this disclosure.

FIG. 5 presents how to determine a trajectory having the longest match with the requested trajectory, according to embodiments of this disclosure.

Status 50: The task is thus to determine among trajectories stored, the trajectory having the longest match with the requested trajectory.

Action 52: The URI as received in a HTTP request may be subjected to normalization. The request as received may comprise information in the form of a parameter of already encoded first and second poses, or as here specified start and goal poses.

The first pose is understood to be identical to the "startPose". Similarly, the second pose is understood to be identical to the "goalPose".

Alternatively, the request comprises information in the form of parameters of start and goal poses, which parameters when read will be subjected to URI-encoding.

If the URI as received contains the parameter "encoded Poses", the parameter "encodedPoses" is moved to the end position of the URI.

Else, i.e. that the URI does not contain the parameter "encoded Poses", the first pose is defined as start pose, s and information is read from array parameter "startPose". The array parameter "startPose" may then be removed from the URI.

Similarly, information about the second pose, being the goal pose is read from array parameter "goalPose", whereby g is defined. Also, the array parameter "goalPose" may then be removed from the URI. Also, maxValue is set equal to the "maxValue" parameter.

Having obtained the startpose, the goalpose and the maxValue, encoding of the start and goal poses into URI is then performed. For this reason the example of FIG. 2 can be advantageously used.

Action 54: It is here determined the minimal matching length.

If information is already present about the length of minimally matching length between a trajectory being determined and a requested trajectory, this information may be read. If a header of the HTTP request (from action 402)

contains "X-minMatchingLength", this content is obtained from the request header and defined as minMatchingLength.

If however a precision measure is contained in the request header, i.e. in the form of the "X-trajPrec" as encoded in the URI according to FIG. 3, this measure is taken into account when determining the minimal matching length between a trajectory being determined and the requested trajectory. Thus if the header contains "X-trajPrec", then trajPrec is set to the read parameter value of "X-trajPrec".

The length of the "encodedStartGoalPoses" is set to lengthEncodedPoses.

The difference between the number of digits of the encodedPoses and the precision measure, i.e. lengthEncodedPoses−trajPrec is set to a maximum unmatching length, i.e. parameter maxUnmatchingLength.

The minimal matching length is determined as the difference between the length of the entire URI string and the determined maximum unmatching length.

The minimal matching length is thus modified based on the precision measure, when present.

The determined minMatchingLength is then added to the request header in the parameter "X-minMatchingLength".

If, however, the header of the request does not contain "X-minMatchingLength", the minMatchingLength is set to the length of the entire URI.

Thus, the minimal matching length has been determined in presence or absence of "X-minMatchingLength" in the header of the request, and when the header contains the "X-trajPrec" parameter.

Action 56: It is here determined the trajectory with the longest match, or matching length.

The URI of the request, from action 402, is compared to the URIs from trajectories stored in the storage 108, and the longest matching length is determined. A FindLongestPrefixEntity function may hence be applied on the Un of the request and the URIs in the storage. The result of the function is thus resulting trajectory, resTrajectory, being determined, as well as the length of the match, i.e. the matchedLength.

Having received a candidate trajectory resTrajectory and the length of matching with the requested trajectory, if it determined whether the length of said matching is equal to, or longer than the determined minimal matching length.

If the determined length of the matching is equal to or longer than what is minimally required, it may be determined that a "isCloseEnough" flag is set to "true".

However, if the determined length of the matching is found to be shorter than what is minimally required, it may be determined that a "isCloseEnough" flag is set to "false". A true "isCloseEnough" matching may be construed as a matching that sufficiently good.

Status 58: The outcome of the determination of a trajectory having the longest match with the requested trajectory, is thus a resTrajectory being the determined trajectory, and the flag "isCloseEnough".

It is noted that when "isCloseEnough" is true, the trajectory "resTrajectory" may be sent to the robot controller 102, in action S122.

It is further noted that when "isCloseEnough" is false a HTTP request may be sent, action S116, to a TGS 109, to calculate a trajectory based on information on the start and goal poses.

Figure 6:
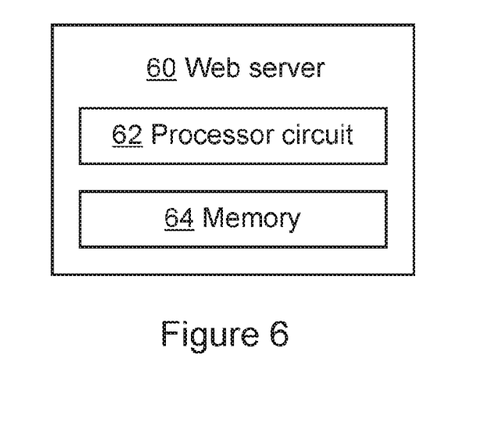
FIGS. 6 and 7 schematically present a Web server according to embodiments of the present disclosure.

FIG. 6 schematically presents a Web server 60 that is capable of determining a trajectory for controlling a robot device over a Web interface in a cloud. The Web server comprises a processor circuit 62 and a memory 64 that has instructions which are executable by the processor circuit 62. When executing these instructions, the processing circuit is configured to receive a HTTP request for the trajectory between a first pose and a second pose of the robot device, where the HTTP request comprises a URI string, comprising information about said first and second poses.

When executing these instructions, the processing circuit is configured to obtain, based on said information about said first and second poses, a URI-encoding of said first and second poses in the URI string, said URI string comprising a set of values defining each first and second pose. When executing these instructions, the processing circuit is also configured to obtain digits from each set of values and with the same weight grouped together, where the digits of each one of said groups are positioned one after the other in said URI string, and where the groups are ordered according to decreasing weight of digits in each group.

When executing these instructions, the processing circuit is configured to obtain a minimally required length of matching digits between a URI-encoded trajectory being requested and a URI-encoded trajectory to be determined.

When executing these instructions, the processing circuit is also configured to determine the longest length of matching digits between the URI-encoded trajectory being requested and a URI-encoding of any one of trajectories in a storage.

When executing these instructions, the processing circuit is also configured to determine whether said longest length of matching digits is shorter than the minimally required length of matching digits, or not.

In addition, when executing these instructions, the processing circuit is configured to send a HTTP response, as a response to the HTTP request, said HTTP response comprising the trajectory to be determined, when the longest length of matching digits is, equal to or, longer than the minimally required length of matching digits. The processing circuit is also configured to send a HTTP request to a trajectory generator service, TGS, to calculate the trajectory being requested, when the longest length of matching digits is shorter than the minimally required length of matching digits.

Moreover, the memory 64 may have instructions executable by the processor circuit 62, where said processor circuit 62 when executing the instructions is configured to read information about said first and second poses and URI-encode said read first and second poses into the URI string.

Also, the memory 64 may have instructions executable by the processor circuit 62, where said processor circuit 62 when executing the instructions is configured to determine said minimally required length based on a required precision measure.

The memory 64 may have instructions executable by the processor circuit 62, where said processor circuit 62 when executing the instructions is configured to determine said minimally required length based on the length of URI-encoded said first and second poses of the trajectory being requested, a length based on the required precision measure, and the length of the URI string.

Also, the memory 64 may have instructions executable by the processor circuit 62, wherein the processor circuit 62 and the memory 64 are comprised in a trajectory aware cache (TAC), of a content delivery network (CDN).

The Web server 104, 60, 70 may comprise a HTTP server.

Figure 7:
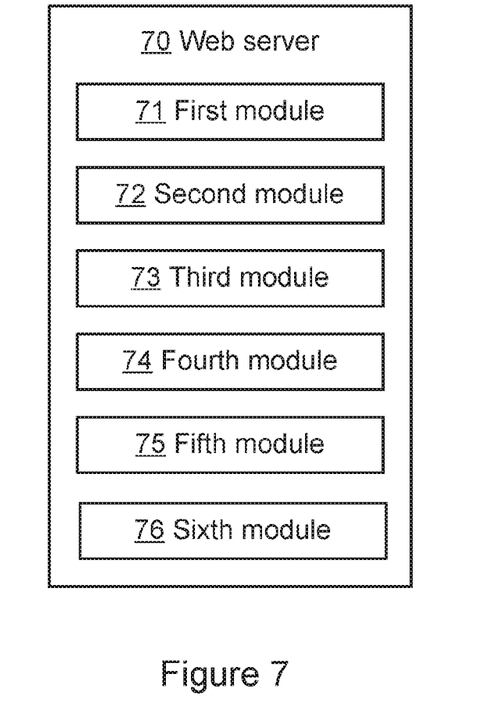

The present disclosure also comprises a Web server 70 as schematically illustrated in FIG. 7. This Web server 70 is adapted to determine a trajectory for controlling a robot device over a Web interface in a cloud. The Web server 70 comprises a first module 71, a second module 72 and a third module 73. The Web server 70 also comprises a fourth module 74, a fifth module 75, and a sixth module 76.

The first module 71 is adapted to receive a HTTP request for the trajectory between a first pose and a second pose of the robot device, where the HTTP request comprises a URI string comprising information about said first and second poses.

The second module 72 is adapted to obtain, based on said information about said first and second poses, a URI-encoding of said first and second poses in the URI string, said URI string comprising a set of values defining each first and second pose. This second module is further adapted to obtain digits from each set of values and with the same weight grouped together, where the digits of each one of said groups are positioned one after the other in said URI string, and wherein the groups are ordered according to decreasing weight of digits in each group.

The third module 73 is adapted to obtain a minimally required length of matching digits between a URI-encoded trajectory being requested and a URI-encoded trajectory to be determined.

The fourth module 74 is adapted to determine the longest length of matching digits between the URI-encoded trajectory being requested and a URI-encoding of any one of trajectories in a storage.

The fifth module 75 is adapted to determine whether said longest length of matching digits is shorter than the minimally required length of matching digits, or not.

The sixth module 76 is adapted to send a HTTP response, as a response to the HTTP request, said HTTP response comprising the trajectory to be determined, when the longest length of matching digits is, equal to or, longer than the minimally required length of matching digits.

The sixth module 76 is also adapted to send a HTTP request to a TGS to calculate the trajectory being requested, when the longest length of matching digits is shorter than the minimally required length of matching digits.

Moreover, the present disclosure also comprises a Web server that is adapted to determine a trajectory for controlling a robot device over a Web interface in a cloud. The Web server is also adapted to receive a HTTP request for the trajectory between a first pose and a second pose of the robot device, where the HTTP request comprises a URI string comprising information about said first and second poses.

The Web server is also adapted to obtain, based on said information about said first and second poses, a URI-encoding of said first and second poses in the URI string, said URI string comprising a set of values defining each first and second pose.

The Web server is also adapted to obtain digits from each set of values and with the same weight grouped together, where the digits of each one of said groups are positioned one after the other in said URI string, and wherein the groups are ordered according to decreasing weight of digits in each group.

The Web server is also adapted to obtain a minimally required length of matching digits between a URI-encoded trajectory being requested and a URI-encoded trajectory to be determined.

The Web server is also adapted to determine the longest length of matching digits between the URI-encoded trajectory being requested and a URI-encoding of any one of trajectories in a storage.

Also, The Web server is adapted to determine whether said longest length of matching digits is shorter than the minimally required length of matching digits, or not.

In addition, the Web server is adapted to send a HTTP response, as a response to the HTTP request, said HTTP response comprising the trajectory to be determined, when the longest length of matching digits is, equal to or, longer than the minimally required length of matching digits.

Also, the Web server is adapted to send a HTTP request to a TGS to calculate the trajectory being requested, when the longest length of matching digits is shorter than the minimally required length of matching digits.

It is noted that the term robot device as used through-out is to be construed broadly. A robot device may comprise a robot, a robot arm, or a robot grip.

Examples and/or embodiments of the present disclosure carry one or more of the following advantages:

It is an advantage of the disclosure that a currently available web service architecture is reused.

The method as discloses herein is easily scalable, since it uses the hypertext transfer protocol.

The method of determining matching between a trajectory being determined and a requested trajectory requires only small computational resources, and also avoids potential latency problems.

ABBREVIATIONS 3D three-dimensional
5G $5^{th}$ generation wireless systems
API application programming interface
CDN content delivery network
DOF degree of freedom
HTTP hypertext transfer protocol
IaaS infrastructure as a service
KPI key performance indicator
PaaS platform as a service
PLC programmable logic controller
RAaaS robotics and automation as a service
SaaS software as a service
TAC trajectory aware cache
TGS trajectory generator service
URI uniform resource identifier
VM virtual machine

The invention claimed is:

1. A method of determining a trajectory in a Web server for controlling a robot device over a web interface in a cloud, the method comprising:
    receiving a hypertext transfer protocol (HTTP) request for the trajectory between a first pose and a second pose of the robot device, wherein the HTTP request comprises a unified resource identifier (URI) string comprising information about the first and second poses;
    obtaining, based on the information about the first and second poses, a URI-encoding of the first and second poses in the URI string, the URI string comprising a set of values defining each first and second pose; wherein the obtaining comprises:
        obtaining digits from each set of values and with the same weight grouped together, where the digits of each one of the groups are positioned one after the other in the URI string, and wherein the groups are ordered according to decreasing weight of digits in each group;
        obtaining a minimally required length of matching digits between a URI-encoded trajectory being requested and a URI-encoded trajectory to be determined;

determining the longest length of matching digits between a URI-encoding of any one of trajectories in a storage and the URI-encoded trajectory being requested;

determining whether the longest length of matching digits is shorter than the minimally required length of matching digits, or not; and based on the determining whether the longest length of matching digits is shorter than the minimally required length of matching digits, either:

in response to the longest length of matching digits being equal to or longer than the minimally required length of matching digits, sending a HTTP response as a response to the HTTP request, the HTTP response comprising the trajectory being determined; or in response to the longest length of matching digits being shorter than the minimally required length of matching digits, sending a HTTP request to a trajectory generator service (TGS) to calculate the trajectory being requested.

2. The method of claim 1, wherein the obtaining the URI-encoding of the first and second poses comprises reading the information about the first and second poses and URI-encoding the read first and second poses into the URI string.

3. The method of claim 1, wherein the obtaining the minimally required length of matching digits comprises obtaining the minimally required length encoded in a header field of the HTTP request.

4. The method of claim 1, wherein the obtaining a minimally required length of matching digits comprises determining the minimally required length based on a required precision measure.

5. The method of claim 4, wherein the determining the minimally required length is based on the length of URI-encoded the first and second poses of the trajectory being requested, a length based on the required precision measure, and the length of the URI string.

6. The method of claim 1, wherein the method is performed in a HTTP cache of the Web server.

7. A non-transitory computer readable recording medium storing a computer program product for determining a trajectory in a Web server for controlling a robot device over a web interface in a cloud, the computer program product comprising program instructions which, when run on processing circuitry of the Web server, causes the Web server to:

receive a hypertext transfer protocol (HTTP) request for the trajectory between a first pose and a second pose of the robot device, wherein the HTTP request comprises a unified resource identifier (URI) string comprising information about the first and second poses;

obtain, based on the information about the first and second poses, a URI-encoding of the first and second poses in the URI string, the URI string comprising a set of values defining each first and second pose; wherein the obtaining comprises:

obtaining digits from each set of values and with the same weight grouped together, where the digits of each one of the groups are positioned one after the other in the URI string, and wherein the groups are ordered according to decreasing weight of digits in each group;

obtaining a minimally required length of matching digits between a URI-encoded trajectory being requested and a URI-encoded trajectory to be determined;

determining the longest length of matching digits between a URI-encoding of any one of trajectories in a storage and the URI-encoded trajectory being requested;

determining whether the longest length of matching digits is shorter than the minimally required length of matching digits, or not; and based on the determining whether the longest length of matching digits is shorter than the minimally required length of matching digits, either:

in response to the longest length of matching digits being equal to or longer than the minimally required length of matching digits, send a HTTP response as a response to the HTTP request, the HTTP response comprising the trajectory being determined; or in response to the longest length of matching digits being shorter than the minimally required length of matching digits, send a HTTP request to a trajectory generator service (TGS) to calculate the trajectory being requested.

8. A Web server capable of determining a trajectory for controlling a robot device over a web interface in a cloud, the Web server comprising:

processing circuitry;

memory containing instructions executable by the processing circuitry whereby the Web server is operative to:

receive a hypertext transfer protocol (HTTP) request for the trajectory between a first pose and a second pose of the robot device, where the HTTP request comprises a unified resource identifier (URI) string comprising information about the first and second poses;

obtain, based on the information about the first and second poses, a URI-encoding of the first and second poses in the URI string, the URI string comprising a set of values defining each first and second pose;

obtain digits from each set of values and with the same weight grouped together, where the digits of each one of the groups are positioned one after the other in the URI string, and wherein the groups are ordered according to decreasing weight of digits in each group;

obtain a minimally required length of matching digits between a URI-encoded trajectory being requested and a URI-encoded trajectory to be determined;

determine the longest length of matching digits between the URI-encoded trajectory being requested and a URI-encoding of any one of trajectories in a storage;

determine whether the longest length of matching digits is shorter than the minimally required length of matching digits, or not; and based on the determination whether the longest length of matching digits is shorter than the minimally required length of matching digits, either:

in response to the longest length of matching digits is, equal to or, longer than the minimally required length of matching digits, send a HTTP response as a response to the HTTP request, the HTTP response comprising the trajectory to be determined; or in response to the longest length of matching digits is shorter than the minimally required length of matching digits, send a HTTP request to a trajectory generator service (TGS) to calculate the trajectory being requested.

9. The Web server of claim 8, wherein the instructions are such that the Web server is operative to read information about the first and second poses and URI-encode the read first and second poses into the URI string.

10. The Web server of claim 8, wherein the instructions are such that the Web server is operative to determine the minimally required length based on a required precision measure.

11. The Web server of claim 10, wherein the instructions are such that the Web server is operative to determine the minimally required length based on the length of URI-encoded the first and second poses of the trajectory being requested, a length based on the required precision measure, and the length of the URI string.

12. The Web server of claim 8, wherein the processing circuitry and memory are comprised in a trajectory aware cache (TAC) of a content delivery network (CDN).

13. The Web server of claim 8, wherein the Web server comprises a HTTP server.

* * * * *